United States Patent
Kim et al.

(10) Patent No.: US 6,911,913 B2
(45) Date of Patent: Jun. 28, 2005

(54) PIEZO-RESISTIVE SENSING OF MIRROR POSITION IN AN OPTICAL SWITCH

(75) Inventors: Jungsang Kim, Basking Ridge, NJ (US); Anatoli Olkhovets, Piscataway, NJ (US); Alex T. Tran, Madison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 242 days.

(21) Appl. No.: 10/261,086

(22) Filed: Sep. 30, 2002

(65) Prior Publication Data

US 2004/0061619 A1 Apr. 1, 2004

(51) Int. Cl.[7] .............................................. G08B 17/06
(52) U.S. Cl. ........................ 340/593; 340/665; 385/15; 385/16; 385/19; 385/25
(58) Field of Search ................................ 340/593, 635, 340/665, 657, 686.1; 385/15, 16, 19, 25; 359/220, 221, 223, 224, 226

(56) References Cited

U.S. PATENT DOCUMENTS

| | | | |
|---|---|---|---|
| 5,136,671 A | 8/1992 | Dragone | |
| 5,600,322 A | 2/1997 | Garavan | |
| 5,648,618 A | 7/1997 | Neukermans et al. | |
| 6,201,631 B1 | 3/2001 | Greywall | |
| 6,243,507 B1 | 6/2001 | Goldstein et al. | |
| 6,275,326 B1 * | 8/2001 | Bhalla et al. | 359/298 |
| 6,292,600 B1 | 9/2001 | Goldstein et al. | |
| 6,526,194 B1 | 2/2003 | Laor | |
| 2003/0214696 A1 | 11/2003 | Oettinger et al. | |

* cited by examiner

Primary Examiner—Julie Bichngoc Lieu

(57) ABSTRACT

An integrated piezo-resistive sensor for determining mirror position in an optical switch. One or more piezo-resistive layers may be formed in silicon springs supporting a movable mirror in the switch. Change in resistivity of those layers due to spring deformation during mirror motion is measured and related to the mirror deflection angle. Information about the angle may be used to provide feedback to the motion actuator, which then may be operated to orient the mirror more accurately. A sensor's sensitivity may be increased by appropriately orienting the springs with respect to the crystallographic axes of the silicon.

25 Claims, 3 Drawing Sheets

PIEZO-RESISTIVE SENSING OF MIRROR POSITION IN AN OPTICAL SWITCH

BACKGROUND OF THE INVENTION

1. Field of the Invention

The invention relates to optical communication equipment and, more specifically, to micro-electromechanical devices for use in such equipment.

2. Description of the Related Art

Optical communication equipment often employs micro-electromechanical systems (MEMS). A typical MEMS system may include an array of micro-machined mirrors, each mirror individually movable in response to an electrical signal. Such an array may be employed in an optical cross-connect, in which each mirror in the array receives a beam of light, for example, from an input optical fiber. The beam is reflected from the mirror and can be redirected to a different location, e.g., at which is located an output optical fiber, by rotating the mirror. More details on the principle of operation and methods of manufacture of MEMS devices including mirror arrays may be found, for example, in commonly assigned U.S. Pat. No. 6,201,631, the teachings of which are incorporated herein by reference.

One problem with prior art MEMS devices is related to determining the actual position of each mirror given any particular input electrical signal, which is important for optimal operation of a MEMS device. With relatively thin springs supporting each mirror/gimbal, there is little space for implementing position sensors, e.g., a four-terminal piezo-voltage torsion sensor such as disclosed in U.S. Pat. No. 5,648,618, the teachings of which are incorporated herein by reference.

SUMMARY OF THE INVENTION

The problems in the prior art are addressed, in accordance with the principles of the invention, by a piezo-resistive sensor integrated into a MEMS device, which is configured to determine mirror position. This is achieved by forming one or more piezo-resistive layers in the silicon springs supporting a movable mirror. Operationally, any change in resistivity of the piezo-resistive layers due to spring deformation during mirror motion is measured and related to the mirror deflection angle. Information about the angle may provide feedback for the motion actuator, which may then be operated to orient the mirror more accurately.

In one embodiment of the invention, a stationary part, a movable part movably coupled to the stationary part, and one or more springs providing the coupling between the stationary and movable parts are integrated into a single device, where at least one of the springs has a piezo-resistive layer, the resistivity of which layer indicates position of the movable part with respect to the stationary part in the integrated device.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1C:
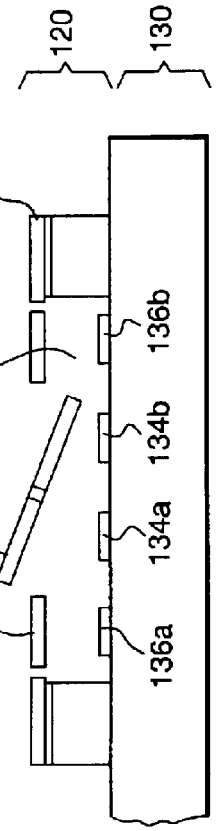
FIGS. 1A–C illustrate top and cross-sectional views of a representative MEMS array that may be used in an optical cross-connect.
Figure 1B:
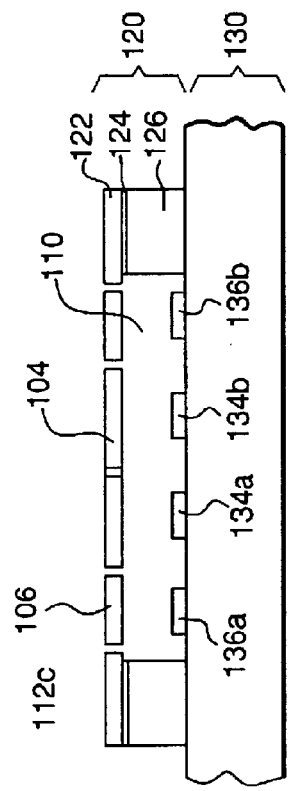
Figure 1A:
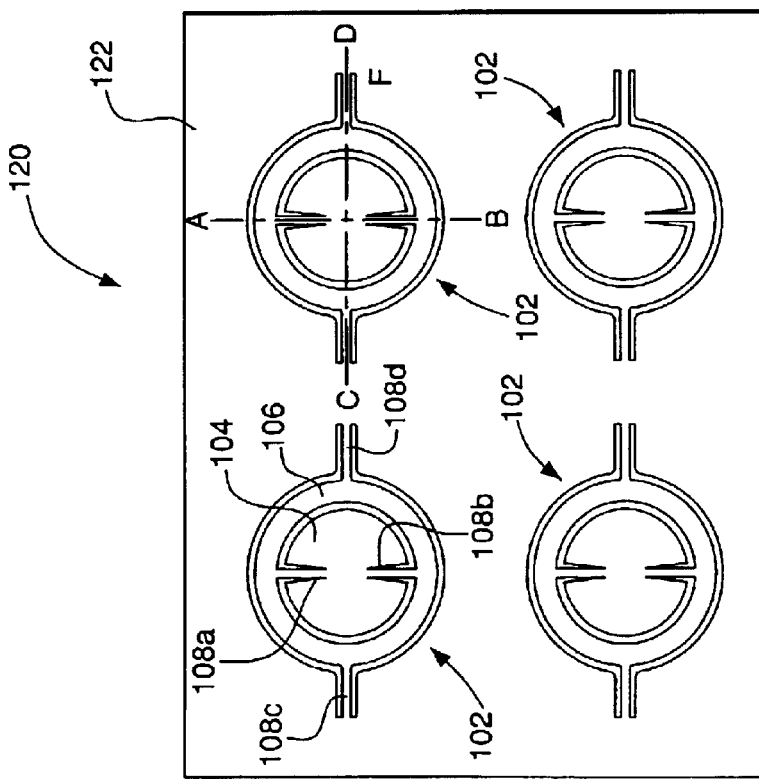

FIG. 1A shows a top view of a representative MEMS array 100 that may be used in an optical cross-connect. Array 100 comprises four two-axis switches 102, each of which includes a movable mirror 104 and a movable gimbal 106, both formed in an overlayer 122 of a wafer 120 using, e.g., reactive etching. Typically, wafer 120 is a silicon-on-insulator (SOI) wafer in which overlayer 122 comprises crystalline silicon. Gimbal 106 is supported on wafer 120 by a pair of springs 108c–d, each connected between gimbal 106 and the rest of overlayer 122. Mirror 104 is coupled to gimbal 106 by a pair of springs 108a–b. In a representative embodiment shown in FIG. 1, each of springs 108a–d is a torsional rod that is about 2 $\mu$m wide.

FIG. 1B shows a cross-sectional view of one switch 102 of array 100. Mirror 104 and gimbal 106 are supported above a cavity 110 defined in an insulating layer 124 and a substrate layer 126 of wafer 120. A second wafer 130 includes electrodes 134a–b and 136a–b as well as electrical interconnections (not shown). Substrate layer 126 is attached to wafer 130 such that electrodes 134 and 136 are located beneath mirror 104 and gimbal 106, respectively, in cavity 110.

FIG. 1C illustrates how mirror 104 can be rotated. More specifically, mirror 104 rotates about the axis defined by springs 108a–b (e.g., axis AB in FIG. 1A) in response to voltage applied to at least one of electrodes 134a–b. In addition, mirror 104 rotates about the axis defined by springs 108c–d (e.g., axis CD in FIG. 1A) together with gimbal 106 when the gimbal rotates about that axis in response to voltage applied to at least one of electrodes 136a–b. Changing the voltages applied to individual electrodes 134a–b and 136a–b can change the angles of rotation about the two axes (e.g., axes AB and CD in FIG. 1A) thus enabling a cross-connecting function of array 100. As already indicated above, detecting an instant position of each mirror 104 is important for enabling optimal operation of array 100.

Figure 2:
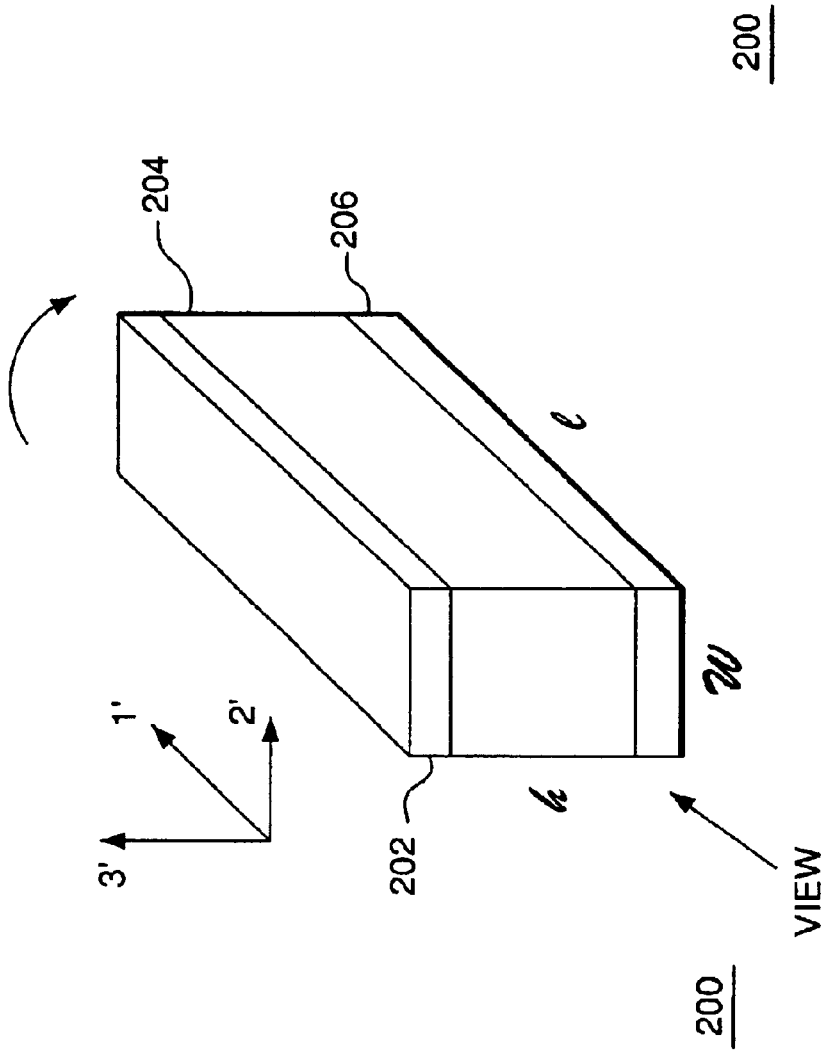
FIG. 2 shows a spring that may be used in the array of FIG. 1 according to one embodiment of the invention.

FIG. 2 shows a spring 200 that may be used for one or more individual springs 108a–d in at least one switch 102 of array 100 of FIG. 1 according to one embodiment of the invention. As shown in FIG. 2, spring 200 is a torsional rod. In a different embodiment, differently shaped springs (e.g., a serpentine spring) may also be implemented. Spring 200 comprises at least three layers: a top layer 202, an intermediate layer 204, and a bottom layer 206. Layers 202 and 206 may be formed using different methods, such as selective epitaxial growth or ion implantation, and be part of a starting substrate or added to the substrate during subsequent processing steps. In one embodiment, spring 200 may be formed by creating layers 202 and 206 using shallow surface doping, in any one of individual springs 108a–d. The one or more dopants used for creating layers 202 and 206 are selected so as to make layers 202 and 206 piezo-resistive. As used in this specification, the terms "piezo-resistive" and "piezo-resistor" mean that electrical resistivity of an element/structure changes when that element/structure is deformed. As known in the art, different dopants may be used to create piezo-resistive layers in silicon. For example, an n-type silicon spring may be doped with boron at the top and bottom surfaces. Similarly, a p-type silicon spring may be doped with phosphorus or arsenic. Typical dopant concentrations are from about $10^{17}$ to about $10^{21}$ cm$^{-3}$; and a typical dopant penetration depth may be between about 100 Angstroms and about 5 microns. Intermediate layer 204 comprises material similar to that of layer 122 of FIG. 1 (e.g., crystalline silicon). In one embodiment, the following representative layer thicknesses may be implemented: about 0.1 μm each, for layers 202 and 206, and about 2.8 μm for layer 204. In different embodiments, different layer thicknesses may be implemented.

Figures 3A, 3B:
FIGS. 3A–B illustrate representative electrical circuits that may be implemented using four springs of the type illustrated in FIG. 2 in the array of FIG. 1 according to one embodiment of the invention.

FIGS. 3A and 3B illustrate representative electrical circuits 300A and 300B, respectively, that may be formed using four springs 200 (hereafter referred to as 200a–d) in switch 102 according to one embodiment of the invention. More specifically, circuit 300A is a top surface circuit comprising four serially connected resistors 302a–d, each of which comprises layer 202 of corresponding spring 200a–d. Similarly, circuit 300B is a bottom surface circuit comprising two serially connected resistors 306c–d, each of which comprises layer 206 of corresponding spring 200c–d. The electrical connections between resistors in circuits 300A and 300B may be implemented by selective surface metallization and/or doping parts of mirror 104 and/or gimbal 106.

Circuits 300A and 300B are preferably electrically isolated from each other. In one embodiment, such isolation may be achieved by using relatively pure silicon, which is known in the art to be a poor conductor, for layers 122 and 204. In another embodiment, layers 202 and 206 may be n-silicon and layers 122 and 204 may be p-silicon or vice versa. The electrical isolation between circuits 300A and 300B may then be provided by appropriately biasing one or more of those layers such that the circuits become diode isolated. In yet another embodiment, spring 200 may include one or more electrically insulating layers comprising, e.g., silicon oxide.

In one embodiment, resistors 302a–d and 306c–d may have the following relative resistivities (R):

$$R_{302a} \approx R_{302b} \equiv R_{mirror} \quad (1)$$

$$R_{302c} \approx R_{302d} \approx R_{306c} \approx R_{306d} \equiv R_{gimbal} \quad (2)$$

Then, $R_{mirror}$ and $R_{gimbal}$ may be independently determined from a measurement of total resistivities of circuits 300A and 300B ($R_{top}$ and $R_{bottom}$, respectively) as follows:

$$R_{gimbal} = \frac{1}{2} R_{bottom} \quad (3)$$

$$R_{mirror} = \frac{1}{2}(R_{top} - R_{bottom}) \quad (4)$$

Figure 4:
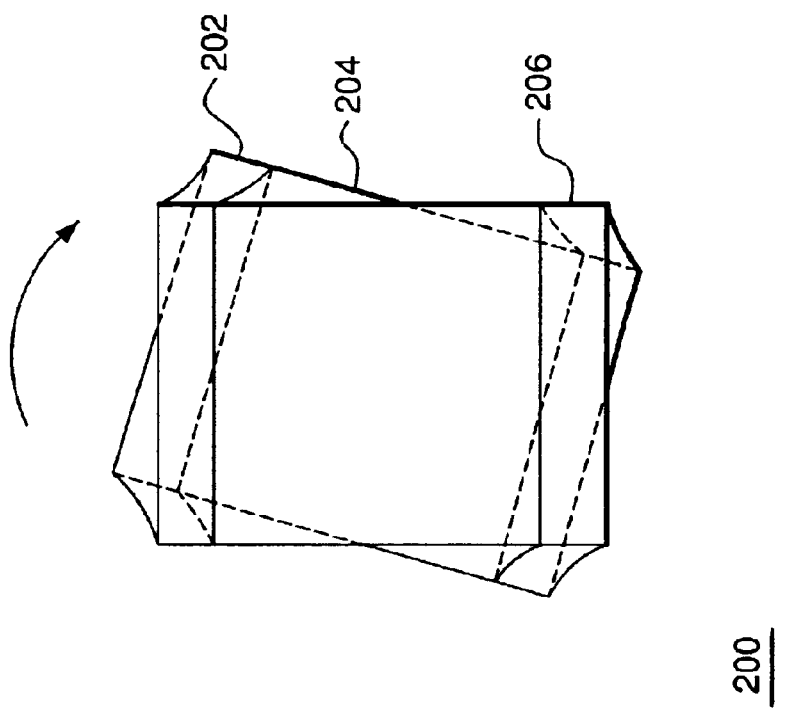
FIG. 4 illustrates deformation of the spring of FIG. 2 during mirror motion.

FIG. 4 illustrates deformation of spring 200 when corresponding mirror 104 or gimbal 106 is rotated. More specifically, FIG. 4 shows a three-dimensional view of spring 200 along the line of sight indicated in FIG. 2 when the back terminus of spring 200 is twisted with respect to the front terminus as shown by corresponding arrows in FIGS. 2 and 4, e.g., due to mirror rotation. As can be seen in FIG. 4, layers 202 and 206 are deformed, which may cause resistivity change in corresponding resistors 302a–d and 306c–d. This resistivity change may be measured using circuits 300A–B. Based on this measurement, the angles of mirror/gimbal rotation about axes AB and CD of FIG. 1A may be determined as further described below in illustrative examples.

In general, relative resistivity change in a piezo-resistor, e.g., comprising layer 202 and subjected to the deformation illustrated in FIG. 4, may be approximated by Equation (5) as follows:

$$\frac{\Delta R}{R_0} \approx \pi'_{11}\sigma'_{11} + \pi'_{12}\sigma'_{22} + \pi'_{13}\sigma'_{33} + \pi'_{14}\sigma'_{23} + \pi'_{15}\sigma'_{13} + \pi'_{16}\sigma'_{12} \quad (5)$$

where $R_0$ is the resistivity of the non-deformed resistor; $\pi'_{ij}$ are piezo-resistive coefficients; $\sigma'_{ii}$ and $\tau'_{ij}$ are the longitudinal and shear stress components, respectively; and the prime sign means that the value is defined with respect to the axes corresponding to the resistor and not to the crystallographic axes of silicon. For example, as shown in FIG. 2, axes 1', 2', and 3' (i.e., the spring coordinate frame) correspond to the long side (length, l) and cross-section (width, w, and height, h), respectively, of spring 200. Indices of the stress components correspond to the directions in the spring frame. Indices of the piezo-resistive coefficients denote the coupling between a corresponding stress component and resistivity change along the 1' direction. Coefficients $\pi'_{ij}$ may be expressed as linear combinations of the corresponding unprimed coefficients defined with respect to the crystallographic axes of silicon. The deformation illustrated in FIG. 4 is characterized by a relatively large shear stress component, $\tau'_{12}$. Among other terms in Equation (5), the next most significant contribution to the resistivity change is related to $\sigma'_{11}$. Below, two representative configurations are analyzed using Equation (5) to illustrate the use of circuits 300A–B for angle detection. As used in the following description, square brackets indicate a crystallographic direction in crystalline silicon and round brackets indicate a crystallographic plane.

In one configuration, the top surface of layer 202 corresponds to the (001) plane in silicon and axis 1' corresponds to the [100] direction (or the [010] direction, which is a crystallographic equivalent of the [100] direction due to the cubic symmetry of silicon). In this situation, $\pi'_{16}=\sigma_{16}=0$ and, as a result, shear stress in the springs will not manifest itself in resistivity change. However, resistivity change will still be induced due to the longitudinal stretching of the springs. Consequently, resistivity change may be approximated as follows:

$$\frac{\Delta R}{R_0} \approx \pi_{11}\sigma_{11} = \pi_{11}Y\varepsilon \quad (6)$$

where Y is the Young's modulus and ε is the strain (=Δl/l, where Δl is the length change for layer 202). For small rotation angles θ, the back terminus of spring 200 moves sideway by displacement d that can be expressed by $$d \approx \frac{h}{2}\theta.$$

Therefore, the corresponding strain of a surface layer can be expressed by Equation (7) as follows:

$$\varepsilon = \Delta l/l = (\sqrt{l^2+d^2}-l)/l \approx d^2/2l^2 \approx h^2\theta^2/8l^2 \quad (7)$$

In one embodiment, layers 202 and 206 comprise n-silicon. It is known that n-silicon has a relatively large (i.e., 1.02×10$^{-9}$ Pa$^{-1}$) longitudinal piezo-resistive coefficient corresponding to the [100] direction and relatively small (i.e., <0.5×10⁻⁹ Pa⁻¹) longitudinal piezo-resistive coefficients corresponding to other directions. For spring 200 having the following dimensions: 2 μm (width)×3 μm (height)×100 μm (length), the sensitivity to deformation (which may be expressed through the differential resistivity change) may be approximated by Equation (8) as follows:

$$\frac{\partial(R/R_0)}{\partial \theta} \approx \pi_{11} Y \frac{\partial \varepsilon}{\partial \theta} = \pi_{11} Y \frac{h^2}{4l^2} \theta = 0.037\theta \quad (8)$$

Equation (8) shows that the sensitivity increases with the angle of rotation. Using Equation (8), one finds that, for θ~6 degrees (or 0.1 radian), the total relative resistivity change is about 0.02%.

In another configuration, axis 1' does not correspond to the [100] direction. In that case, the resistivity change is dominated by the corresponding shear stress term in Equation (5) and may be approximated as follows:

$$\frac{\Delta R}{R_0} \approx \pi'_{16} \sigma'_{12} \quad (9)$$

By relating $\pi'_{16}$ to the corresponding unprimed piezo-resistive coefficients in silicon, one can show that a maximum sensitivity is achieved when axis 1' is at about 22.5 degrees with respect to the [100] direction. For θ~6 degrees, $\tau'_{12}$ is approximately 90 MPa. Then, using Equation (9), one finds that the total relative resistivity change is (i) about 6.3%, if layers 202 and 206 comprise n-silicon (corresponding to $\pi'_{16}$~0.7×10⁻⁹ Pa⁻¹), and (ii) about 5.8%, if layers 202 and 206 comprise p-silicon (corresponding to $\pi'_{16}$~0.65×10⁻⁹ Pa⁻¹). Therefore, the sensitivity to deformation may be increased by appropriately orienting the spring with respect to the crystallographic axes of silicon.

In one embodiment, the resistivity change is measured by sending a constant current through circuits 300A and 300B and measuring voltage change due to a deformation. For a reliable measurement, the voltage change should preferably exceed a threshold value ($V_{min}$) corresponding to the noise level. If circuits 300A and 300B are a dominant source of noise, then the noise power, for example for circuit 300A, is given as follows:

$$P_{noise} = 4k_B T R_{top} B \quad (10)$$

where $k_B$ is the Boltzmann constant; T is temperature; and B is the measurement bandwidth. Using Equation (10), a minimum detectable resistivity change may be expressed by Equation (11) as follows:

$$\left(\frac{\Delta R}{R_0}\right)_{min} \approx \sqrt{\frac{P_{noise}}{V_{min}^2}} = \sqrt{\frac{4k_B T B}{P_c}} \quad (11)$$

where $P_c$ is the power dissipated in corresponding circuit 300A or 300B at $V_{min}$. Using Equation (11), one finds that, for $P_c$=10 μW (a value corresponding to a relatively low power dissipation level) and B=1 kHz, the minimum detectable resistivity change is about 0.00013%. Comparing this value with the above-obtained values for total relative resistivity change corresponding to θ~6 degrees in either configuration, one may conclude that using circuits 300A and 300B can provide sufficient accuracy/sensitivity for angle determination.

As known in the art, different methods may be used to measure resistivity or resistivity change of circuits 300A–B. In one embodiment, resistivity may be measured using a bridge method. For example, two Wheatstone bridges may be implemented, one using circuit 300A and another using circuit 300B, and each using the corresponding analogous circuits that are not subjected to deformation during mirror motion. Such analogous circuits may be implemented in layer 122 of wafer 120, and need not have identical layout to circuits 300A–B as long as they provide appropriate resistance. In a different embodiment, a "no bridge" method may be used to measure resistivity change, wherein motion of the mirror may be detected based on such change.

The invention may provide one or more of the following advantages. Circuits 300A–B provide an integrated position sensor that may be implemented in a switch configured with springs having a relatively narrow width. Information about the mirror position obtained with such sensor may be used to provide feedback to the actuating electrodes (e.g., electrodes 134 and 136 in switch 100 of FIG. 1). Such feedback may be used to provide shaped pulses to the actuating electrodes, where the voltage applied to each electrode is a function of mirror position. Shaped pulses may be used to increase the switching speed. In addition, the feedback may be used to stabilize the mirror in the unstable angle region close to or beyond snap-down. As a result, the available angular range of the mirror may be extended.

While this invention has been described with reference to illustrative embodiments, this description is not intended to be construed in a limiting sense. Sensing circuits different from circuits 300A–B may be implemented using piezo-resistors formed in the springs. A spring may have either one piezo-resistive layer adjacent to the top or bottom surface or two piezo-resistive layers adjacent to the top and bottom surfaces. In addition, some of the springs used in an optical switch may not have piezo-resistive layers. Furthermore, differently shaped springs may be used, where the term "spring" refers in general to any suitable elastic structure that can recover its original shape after being distorted. Also, a sensor of the invention may be implemented in materials different from silicon. In a one-axis switch, one or more springs 200 may be used to implement a motion sensor having a single sensing circuit may be used (i.e., involving only the top layer or only the bottom layer of one or more springs). The invention may be employed in devices in which the motion between a moving part and a stationary part is translation, in addition to or instead of rotation. Various modifications of the described embodiments, as well as other embodiments of the invention, which are apparent to persons skilled in the art to which the invention pertains are deemed to lie within the principle and scope of the invention as expressed in the following claims.

What is claimed is:

1. A MEMS device, comprising:
    a stationary part; and
    at least one spring movably coupling the stationaly part and a movable part of the MEMS device and having first and second piezo-resistive layers, wherein the resistivity of the first piezo-resistive layer indicates position of the movable part with respect to the stationary part.

2. The invention of claim 1, wherein the first piezo-resistive layer is adapted to deform as a result of motion of the movable part relative to the stationary part.

3. The invention of claim 1, wherein the second piezo-resistive layer is substantially electrically isolated from the first piezo-resistive layer.

4. The invention of claim 3, wherein the at least one spring further comprises a third layer located between the first and second piezo-resistive layers, the third layer providing electrical isolation between the first and second piezo-resistive layers.

5. The invention of claim 4, wherein:
the first and second piezo-resistive layers comprise n-silicon;
the third layer comprises p-silicon; and
when at least one of the first and second piezo-resistive layers is electrically biased relative to the third layer, the first piezo-resistive layer is diode isolated from the second piezo-resistive layer.

6. The invention of claim 3, wherein:
the movable part comprises:
a first plate; and
a second plate rotatably coupled between the first plate and the stationary part to enable motion of the first plate relative to the second plate and motion of the second plate relative to the stationary part, wherein the at least one spring is a first spring connected between the second plate and the stationary part; and
a second spring is connected between the first and second plates, the second spring comprising at least one piezo-resistive layer, wherein the resistivities of the first and second piezo-resistive layers of the first spring and the at least one piezo-resistive layer of the second spring indicate orientation of the first plate with respect to the stationary part.

7. The invention of claim 6, wherein:
the first and second piezo-resistive layers of the first spring are adapted to deform as a result of motion of the second plate relative to the stationary part; and
the at least one piezo-resistive layer of the second spring is adapted to deform as a result of motion of the first plate relative to the second plate.

8. The invention of claim 6, wherein a surface of the second plate is at least partially metal-plated to enable electrical connection between the first piezo-resistive layer of the first spring and the at least one piezo-resistive layer of the second spring.

9. The invention of claim 6, wherein a surface of the second plate is at least partially selectively-doped to provide electrical connection between the first piezo-resistive layer of the first spring and the piezo-resistive layer of the second spring.

10. The invention of claim 6, wherein:
a third spring is connected between the second plate and the stationary part, the third spring comprising a first piezo-resistive layer and a second piezo-resistive layer substantially electrically isolated from each other;
a fourth spring is connected between the first plate and the second plate, the fourth spring comprising at least one piezo-resistive layer;
the first and third springs are connected to opposite sides of the second plate;
the second and fourth springs are connected to opposite sides of the first plate;
the first and second piezo-resistive layers of each of the first and third springs are adapted to deform as a result of motion of the second plate relative to the stationary part;
the at least one piezo-resistive layer of each of the second and fourth springs is adapted to deform as a result of motion of the first plate relative to the second plate;
the first piezo-resistive layer of the first spring, the at least one piezo-resistive layer of the second spring, the first piezo-resistive layer of the third spring, and the at least one piezo-resistive layer of the fourth spring are electrically connected in series to form at least part of a first sensing circuit; and
the second piezo-resistive layer of the first spring and the second piezo-resistive layer of the third spring are electrically connected in series to form at least part of a second sensing circuit.

11. The invention of claim 10, wherein at least one of the first and second sensing circuits is part of a bridge adapted for resistivity measurements.

12. The invention of claim 1, wherein the MEMS device is implemented in a wafer comprising crystalline silicon and the at least one spring is oriented at about 22.5 degrees with respect to a [100] crystallographic direction in the silicon.

13. The invention of claim 1, wherein the MEMS device is an optical switch and is implemented in an integrated device having two or more optical switches.

14. The invention of claim 1, wherein the MEMS device is adapted to generate a feedback signal based on the position of the movable part with respect to the stationary part to control motion of the movable part.

15. The invention of claim 1, wherein the at least one spring is a serpentine spring.

16. A method comprising:
measuring resistivity of a piezo-resistive layer of at least one spring movably coupling a stationary part and a movable part of a MEMS device, wherein the at least one spring has at least two piezo-resistive layers; and
determining position of the movable part with respect to the stationary part of the MEMS device based on the measured resistivity.

17. The invention of claim 16, further comprising generating a feedback signal based on the position of the movable part with respect to the stationary part to control motion of the movable part.

18. Apparatus comprising:
means for measuring resistivity of a piezo-resistive layer of at least one spring movably coupling a stationary part and a movable part of a MEMS device, wherein the at least one spring has at least two piezo-resistive layers; and
means for determining position of the movable part with respect to the stationary part of the MEMS device based on the measured resistivity.

19. The invention of claim 18, further comprising means for generating a feedback signal based on the position of the movable part with respect to the stationary part to control motion of the movable part.

20. The invention of claim 16, wherein a first piezo-resistive layer is substantially electrically isolated from a second piezo-resistive layer.

21. The invention of claim 20, wherein the at least one spring has a third layer located between the first and second piezo-resistive layers, the third layer providing electrical isolation between the first and second piezo-resistive layers.

22. The invention of claim 20, wherein:
the movable part comprises:
a first plate; and
a second plate rotatably coupled between the first plate and the stationary part to enable motion of the first plate relative to the second plate and motion of the second plate relative to the stationary part, wherein the at least one spring is a first spring connected between the second plate and the stationary part; and
a second spring is connected between the first and second plates, the second spring comprising at least one piezo-resistive layer, wherein the resistivities of the first and second piezo-resistive layers of the first spring and the at least one piezo-resistive layer of the second spring indicate orientation of the first plate with respect to the stationary part.

23. The invention of claim 18, wherein a first piezo-resistive layer is substantially electrically isolated from a second piezo-resistive layer.

24. The invention of claim 23, wherein the at least one spring has a third layer located between the first and second piezo-resistive layers, the third layer providing electrical isolation between the first and second piezo-resistive layers.

25. The invention of claim 23, wherein:

the movable part comprises:

a first plate; and a second plate rotatably coupled between the first plate and the stationary part to enable motion of the first plate relative to the second plate and motion of the second plate relative to the stationary part, wherein the at least one spring is a first spring connected between the second plate and the stationary part; and a second spring is connected between the first and second plates, the second spring comprising at least one piezo-resistive layer, wherein the resistivities of the first and second piezo-resistive layers of the first spring and the at least one piezo-resistive layer of the second spring indicate orientation of the first plate with respect to the stationary part.

* * * * *